United States Patent
Kim et al.

(10) Patent No.: US 12,192,843 B2
(45) Date of Patent: *Jan. 7, 2025

(54) ELECTRONIC DEVICE AND COMMUNICATION METHOD USING 4G AND 5G COMMUNICATION BASED ON TEMPERATURE

(71) Applicant: Samsung Electronics Co., Ltd., Gyeonggi-do (KR)

(72) Inventors: Hee Tae Kim, Gyeonggi-do (KR); Jung Tae Kim, Gyeonggi-do (KR); Soo Hyun Moon, Gyeonggi-do (KR); Kye Jeong Jeong, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 285 days.

This patent is subject to a terminal disclaimer.

(21) Appl. No.: 17/545,021

(22) Filed: Dec. 8, 2021

(65) Prior Publication Data

US 2022/0095193 A1 Mar. 24, 2022

Related U.S. Application Data

(63) Continuation of application No. 17/326,525, filed on May 21, 2021, now Pat. No. 11,218,938, which is a
(Continued)

(30) Foreign Application Priority Data

Nov. 24, 2017 (KR) ........................ 10-2017-0158289

(51) Int. Cl.
*H04W 36/30* (2009.01)
*H04W 36/14* (2009.01)
(Continued)

(52) U.S. Cl.
CPC .......... *H04W 36/24* (2013.01); *H04W 36/144* (2023.05); *H04W 36/304* (2023.05); *H04W 88/02* (2013.01)

(58) Field of Classification Search
None
See application file for complete search history.

(56) References Cited

U.S. PATENT DOCUMENTS 6,760,311 B1 7/2004 Raith
6,892,312 B1 5/2005 Johnson
(Continued)

FOREIGN PATENT DOCUMENTS

CN 101848518 A 9/2010
CN 103119850 A 5/2013
(Continued)

OTHER PUBLICATIONS

Notice of Patent Grant dated Feb. 17, 2023.
(Continued)

*Primary Examiner* — Diane L Lo
(74) *Attorney, Agent, or Firm* — Cha & Reiter, LLC

(57) ABSTRACT

Certain embodiments of the present disclosure relate to an electronic device and a communication method thereof. The electronic device includes a housing comprising a first plate and a second plate facing a direction opposite the first plate; a first transceiver disposed in the housing; a second transceiver disposed in the housing and to having a data throughput lower than that of the first transceiver; at least one processor operatively connected to the first transceiver and to the second transceiver; and a memory operative connected to the at least one processor, wherein the memory stores instructions that, when executed, cause the at least one processor to perform operations comprising: determining whether the data throughput of the first transceiver is equal
(Continued)

to or greater than a designated reference value, monitoring a temperature of the first transceiver when the data throughput is equal to or greater than the designated reference value, and determining whether to perform a handover from the first transceiver to the second transceiver based at least in part on whether the monitored temperature is equal to or higher than a first designated reference temperature.

20 Claims, 11 Drawing Sheets

Related U.S. Application Data continuation of application No. 16/198,923, filed on Nov. 23, 2018, now Pat. No. 11,019,548.

(51) Int. Cl.
  *H04W 36/24* (2009.01)
  *H04W 88/02* (2009.01)

(56) References Cited

U.S. PATENT DOCUMENTS

| | | |
|---|---|---|
| 7,668,297 B2 | 2/2010 | Inazuru et al. |
| 7,732,027 B2 | 6/2010 | Matsuura et al. |
| 7,833,644 B2 | 11/2010 | Chokai et al. |
| 7,888,078 B2 | 2/2011 | Shimose et al. |
| 8,105,183 B2 | 1/2012 | Yoo et al. |
| 8,401,341 B2 | 3/2013 | Miyamoto |
| 8,455,081 B2 | 6/2013 | Jacobs et al. |
| 8,524,336 B2 | 9/2013 | Oguri et al. |
| 8,675,615 B2 | 3/2014 | Anderson et al. |
| 8,749,508 B2 | 6/2014 | Takai et al. |
| 8,784,923 B2 | 7/2014 | Kanno |
| 8,957,278 B2 | 2/2015 | Kainth et al. |
| 9,023,488 B2 | 5/2015 | Nakajima et al. |
| 9,092,659 B2 | 7/2015 | Shimada et al. |
| 9,132,610 B2 | 9/2015 | Takahashi et al. |
| 9,133,346 B2 | 9/2015 | Shiragaki et al. |
| 9,252,569 B2 | 2/2016 | Sakayanagi et al. |
| 9,293,594 B2 | 3/2016 | Nishimura et al. |
| 9,318,746 B2 | 4/2016 | Yu et al. |
| 9,352,976 B2 | 5/2016 | Jiang et al. |
| 9,356,272 B2 | 5/2016 | Kida |
| 9,388,008 B2 | 7/2016 | Horiuchi et al. |
| 9,497,702 B2 | 11/2016 | Joung et al. |
| 9,510,238 B2 | 11/2016 | Joung et al. |
| 9,521,892 B2 | 12/2016 | Serres-Vives et al. |
| 9,551,098 B2 | 1/2017 | Reiter et al. |
| 9,631,081 B2 | 4/2017 | Kato et al. |
| 9,907,336 B2 | 3/2018 | Cashmore et al. |
| 9,920,460 B2 | 3/2018 | Kitagawa et al. |
| 9,951,436 B2 | 4/2018 | Bullington et al. |
| 9,956,750 B2 | 5/2018 | Iwasaki |
| 9,960,496 B2 | 5/2018 | Kim |
| 9,970,116 B2 | 5/2018 | Fujita et al. |
| 10,187,091 B2 | 1/2019 | Kim et al. |
| 11,218,938 B2 * | 1/2022 | Kim .............. H04W 36/14 |
| 2006/0003083 A1 | 1/2006 | Kouda et al. |
| 2009/0202878 A1 | 8/2009 | Schild |
| 2009/0258063 A1 | 10/2009 | Udagawa et al. |
| 2010/0112936 A1 | 5/2010 | Friman et al. |
| 2010/0273517 A1 | 10/2010 | Pinheiro et al. |
| 2011/0052717 A1 | 3/2011 | Ducrey et al. |
| 2012/0075992 A1 | 3/2012 | Shahidi et al. |
| 2012/0281558 A1 | 11/2012 | Anderson et al. |
| 2013/0078977 A1 | 3/2013 | Anderson et al. |
| 2013/0332720 A1 | 12/2013 | Gupta et al. |
| 2014/0077893 A1 | 3/2014 | Lee et al. |
| 2014/0199952 A1 | 7/2014 | Sandhu et al. |
| 2015/0004476 A1 | 1/2015 | Ito et al. |
| 2015/0065037 A1 | 3/2015 | Burrell et al. |
| 2015/0071140 A1 | 3/2015 | Tarighat Mehrabani et al. |
| 2015/0107769 A1 | 4/2015 | Nakano |
| 2015/0315424 A1 | 11/2015 | Lee et al. |
| 2015/0349836 A1 | 12/2015 | Ponukumati et al. |
| 2016/0066335 A1 | 3/2016 | Clevorn et al. |
| 2016/0255524 A1 | 9/2016 | Yokosawa et al. |
| 2016/0279897 A1 | 9/2016 | Yamazaki et al. |
| 2016/0353184 A1 | 12/2016 | Sindia |
| 2017/0078913 A1 | 3/2017 | Chang et al. |
| 2017/0189557 A1 | 7/2017 | Park et al. |
| 2017/0208426 A1 | 7/2017 | Komoni et al. |
| 2017/0272995 A1 | 9/2017 | Kim et al. |
| 2017/0353898 A1 | 12/2017 | Karakkad Kesavan Namboodiri et al. |
| 2018/0077592 A1 | 3/2018 | Kim et al. |
| 2018/0226649 A1 | 8/2018 | Wakizaka et al. |
| 2019/0069229 A1 | 2/2019 | Lee et al. |
| 2019/0387440 A1 | 12/2019 | Mu et al. |

FOREIGN PATENT DOCUMENTS

| | | |
|---|---|---|
| CN | 103391109 A | 11/2013 |
| CN | 103828246 A | 5/2014 |
| CN | 105101330 A | 11/2015 |
| CN | 105392158 A | 3/2016 |
| CN | 205232219 U | 5/2016 |
| CN | 105680934 A | 6/2016 |
| CN | 105872441 A | 8/2016 |
| CN | 106358223 A | 1/2017 |
| CN | 106454916 A | 2/2017 |
| CN | 106537849 A | 3/2017 |
| EP | 2 998 345 A1 | 3/2016 |
| EP | 2 431 706 B1 | 8/2017 |
| JP | 11-275171 A | 10/1999 |
| JP | 2001-357369 A | 12/2001 |
| JP | 2002-531023 A | 9/2002 |
| JP | 2006-165860 A | 6/2006 |
| JP | 2006-245862 A | 9/2006 |
| JP | 2008-244603 A | 10/2008 |
| JP | 2011-155589 A | 8/2011 |
| JP | 2013-546214 A | 12/2013 |
| JP | 2014-192758 A | 10/2014 |
| JP | 2014-216909 A | 11/2014 |
| JP | WO2015/059889 A1 | 4/2015 |
| JP | 2015-524210 A | 8/2015 |
| JP | 2017-120494 A | 7/2017 |
| JP | WO2016/133122 A1 | 11/2017 |
| KR | 1998-015050 A | 5/1998 |
| KR | 1999-026912 A | 4/1999 |
| KR | 1999-0048923 A | 7/1999 |
| KR | 1999-0051958 A | 7/1999 |
| KR | 1999-0053139 A | 7/1999 |
| KR | 1999-0061723 A | 7/1999 |
| KR | 10-2006-0049331 A | 5/2006 |
| KR | 10-2006-0112593 A | 11/2006 |
| KR | 10-2007-0072038 A | 7/2007 |
| KR | 10-2007-0089820 A | 9/2007 |
| KR | 10-2007-0102994 A | 10/2007 |
| KR | 10-2007-0113216 A | 11/2007 |
| KR | 10-2007-0121729 A | 12/2007 |
| KR | 10-2007-0121807 A | 12/2007 |
| KR | 10-2008-0028453 A | 3/2008 |
| KR | 10-2008-0044853 A | 5/2008 |
| KR | 10-2008-0052554 A | 6/2008 |
| KR | 10-2008-0061155 A | 7/2008 |
| KR | 10-2008-0061899 A | 7/2008 |
| KR | 10-2008-0089343 A | 10/2008 |
| KR | 10-2008-0104703 A | 12/2008 |
| KR | 10-2008-0114737 A | 12/2008 |
| KR | 10-2009-0019734 A | 2/2009 |
| KR | 10-2009-0049597 A | 5/2009 |
| KR | 10-2010-0015949 A | 2/2010 |
| KR | 10-2010-0023950 A | 3/2010 |
| KR | 10-2010-0051033 A | 5/2010 |
| KR | 10-2010-0087145 A | 8/2010 |
| KR | 10-2010-0105581 A | 9/2010 |
| KR | 10-2011-0009857 A | 1/2011 |
| KR | 10-2011-0035981 A | 4/2011 |
| KR | 10-2011-0044375 A | 4/2011 |
| KR | 10-2011-0073992 A | 6/2011 |

(56) References Cited

FOREIGN PATENT DOCUMENTS

| | | |
|---|---|---|
| KR | 10-2011-0076140 A | 7/2011 |
| KR | 10-2011-0078137 A | 7/2011 |
| KR | 10-2011-0082285 A | 7/2011 |
| KR | 10-2011-0083590 A | 7/2011 |
| KR | 10-2011-0108896 A | 10/2011 |
| KR | 10-2011-0132237 A | 12/2011 |
| KR | 10-2011-0133638 A | 12/2011 |
| KR | 10-2011-0136415 A | 12/2011 |
| KR | 10-2011-0136989 A | 12/2011 |
| KR | 10-2012-0004612 A | 1/2012 |
| KR | 10-2012-0020865 A | 3/2012 |
| KR | 10-2012-0022943 A | 3/2012 |
| KR | 10-2012-0032528 A | 4/2012 |
| KR | 10-2012-0041303 A | 5/2012 |
| KR | 10-2012-0041824 A | 5/2012 |
| KR | 10-2012-0047451 A | 5/2012 |
| KR | 10-2012-0051376 A | 5/2012 |
| KR | 10-2012-0064170 A | 6/2012 |
| KR | 10-2012-0068374 A | 6/2012 |
| KR | 10-2012-0070349 A | 6/2012 |
| KR | 10-2012-0074752 A | 7/2012 |
| KR | 10-2012-0076096 A | 7/2012 |
| KR | 10-2012-0078132 A | 7/2012 |
| KR | 10-2012-0081866 A | 7/2012 |
| KR | 10-2012-0123171 A | 11/2012 |
| KR | 10-2012-0129519 A | 11/2012 |
| KR | 10-2012-0130268 A | 11/2012 |
| KR | 10-1203120 B1 | 11/2012 |
| KR | 10-1207163 B1 | 11/2012 |
| KR | 10-2012-0134497 A | 12/2012 |
| KR | 10-2012-0135417 A | 12/2012 |
| KR | 10-2013-0001770 A | 1/2013 |
| KR | 10-2013-0011558 A | 1/2013 |
| KR | 10-1222743 B1 | 1/2013 |
| KR | 10-1224125 B1 | 1/2013 |
| KR | 10-2013-0012656 A | 2/2013 |
| KR | 10-1241300 B1 | 3/2013 |
| KR | 10-2013-0033639 A | 4/2013 |
| KR | 10-2013-0037092 A | 4/2013 |
| KR | 10-2013-0042504 A | 4/2013 |
| KR | 10-2013-0042897 A | 4/2013 |
| KR | 10-1257845 B1 | 4/2013 |
| KR | 10-2013-0044092 A | 5/2013 |
| KR | 10-2013-0045898 A | 5/2013 |
| KR | 10-2013-0058671 A | 6/2013 |
| KR | 10-2013-0060200 A | 6/2013 |
| KR | 10-1279603 B1 | 6/2013 |
| KR | 10-2013-0071800 A | 7/2013 |
| KR | 10-2013-0090189 A | 8/2013 |
| KR | 10-2013-0091679 A | 8/2013 |
| KR | 10-1299403 B1 | 8/2013 |
| KR | 10-2013-0098178 A | 9/2013 |
| KR | 10-2013-0103997 A | 9/2013 |
| KR | 10-1309665 B1 | 9/2013 |
| KR | 10-2013-0107130 A | 10/2013 |
| KR | 10-2013-0119185 A | 10/2013 |
| KR | 10-1307940 B1 | 10/2013 |
| KR | 10-1317218 B1 | 10/2013 |
| KR | 10-2013-0120150 A | 11/2013 |
| KR | 10-2013-0126725 A | 11/2013 |
| KR | 10-2013-0126810 A | 11/2013 |
| KR | 10-1334398 B1 | 11/2013 |
| KR | 10-1335161 B1 | 11/2013 |
| KR | 10-2014-0001096 A | 1/2014 |
| KR | 10-2014-0002351 A | 1/2014 |
| KR | 10-1353856 B1 | 1/2014 |
| KR | 10-2014-0014265 A | 2/2014 |
| KR | 10-2014-0017989 A | 2/2014 |
| KR | 10-1359098 B1 | 2/2014 |
| KR | 10-1364811 B1 | 2/2014 |
| KR | 10-2014-0025818 A | 3/2014 |
| KR | 10-2014-0026965 A | 3/2014 |
| KR | 10-2014-0049721 A | 4/2014 |
| KR | 10-2014-0061112 A | 5/2014 |
| KR | 10-1398574 B1 | 5/2014 |
| KR | 10-1398627 B1 | 5/2014 |
| KR | 10-1399385 B1 | 5/2014 |
| KR | 10-2014-0074980 | 6/2014 |
| KR | 10-2014-0075193 A | 6/2014 |
| KR | 10-2014-0077667 A | 6/2014 |
| KR | 10-1399243 B1 | 6/2014 |
| KR | 10-1406162 B1 | 6/2014 |
| KR | 10-1409888 B1 | 6/2014 |
| KR | 10-2014-0085062 A | 7/2014 |
| KR | 10-1420755 B1 | 7/2014 |
| KR | 10-2014-0105442 A | 9/2014 |
| KR | 10-2014-0111316 A | 9/2014 |
| KR | 10-2014-0124865 A | 10/2014 |
| KR | 10-2014-0127084 A | 11/2014 |
| KR | 10-2014-0134186 A | 11/2014 |
| KR | 10-1461359 B1 | 11/2014 |
| KR | 10-1465457 B1 | 11/2014 |
| KR | 10-2014-0139638 | 12/2014 |
| KR | 10-1472096 B1 | 12/2014 |
| KR | 10-1476829 B1 | 12/2014 |
| KR | 10-1476830 B1 | 12/2014 |
| KR | 10-2015-0004245 | 1/2015 |
| KR | 10-2015-0013749 | 2/2015 |
| KR | 10-2015-0016997 A | 2/2015 |
| KR | 10-2015-0019911 | 2/2015 |
| KR | 10-1496710 B1 | 2/2015 |
| KR | 10-1496709 B1 | 3/2015 |
| KR | 10-1496711 B1 | 3/2015 |
| KR | 10-1498179 B1 | 3/2015 |
| KR | 10-1502268 B1 | 3/2015 |
| KR | 10-1504434 B1 | 3/2015 |
| KR | 10-2015-0039826 | 4/2015 |
| KR | 10-2015-0040214 | 4/2015 |
| KR | 10-2015-0052671 | 5/2015 |
| KR | 10-1518676 B1 | 5/2015 |
| KR | 10-2015-0061535 | 6/2015 |
| KR | 10-2015-0061536 | 6/2015 |
| KR | 10-2015-0073884 | 7/2015 |
| KR | 10-2015-0074091 | 7/2015 |
| KR | 10-2015-0085584 A | 7/2015 |
| KR | 10-2015-0086087 A | 7/2015 |
| KR | 10-1536851 B1 | 7/2015 |
| KR | 10-1537258 B1 | 7/2015 |
| KR | 10-2015-0088488 A | 8/2015 |
| KR | 10-1554018 B1 | 9/2015 |
| KR | 10-1557058 B1 | 10/2015 |
| KR | 10-1560270 B1 | 10/2015 |
| KR | 10-1564177 B1 | 10/2015 |
| KR | 10-1581637 B1 | 12/2015 |
| KR | 10-2016-0006011 A | 1/2016 |
| KR | 10-2016-0013155 A | 2/2016 |
| KR | 10-1591850 B1 | 2/2016 |
| KR | 10-1600282 B1 | 3/2016 |
| KR | 10-1602328 B1 | 3/2016 |
| KR | 10-1604385 B1 | 3/2016 |
| KR | 10-2016-0040397 A | 4/2016 |
| KR | 10-2016-0042271 A | 4/2016 |
| KR | 10-2016-0042272 A | 4/2016 |
| KR | 10-2016-0044604 A | 4/2016 |
| KR | 10-2016-0046024 A | 4/2016 |
| KR | 10-2016-0046025 A | 4/2016 |
| KR | 10-2016-0046026 A | 4/2016 |
| KR | 10-2016-0050007 A | 5/2016 |
| KR | 10-2016-0057567 A | 5/2016 |
| KR | 10-2016-0060833 A | 5/2016 |
| KR | 10-2016-0066786 A | 6/2016 |
| KR | 10-2016-0073737 A | 6/2016 |
| KR | 10-2016-0084436 A | 7/2016 |
| KR | 10-1640499 B1 | 7/2016 |
| KR | 10-1647737 B1 | 8/2016 |
| KR | 10-2016-0124271 A | 10/2016 |
| KR | 10-1663285 B1 | 10/2016 |
| KR | 10-2016-0132341 A | 11/2016 |
| KR | 10-1671635 B1 | 11/2016 |
| KR | 10-2017-0004458 A | 1/2017 |
| KR | 10-2017-0005294 A | 1/2017 |
| KR | 10-2017-0006616 A | 1/2017 |
| KR | 10-1700528 B1 | 1/2017 |
| KR | 10-2017-0010634 A | 2/2017 |

(56) References Cited

FOREIGN PATENT DOCUMENTS

| KR | 10-2017-0011169 A | 2/2017 |
|---|---|---|
| KR | 10-1701104 B1 | 2/2017 |
| KR | 10-2017-0029375 A | 3/2017 |
| KR | 10-2017-0029376 A | 3/2017 |
| KR | 10-2017-0041036 A | 4/2017 |
| KR | 10-1726996 B1 | 4/2017 |
| KR | 10-1728027 B1 | 4/2017 |
| KR | 10-1728328 B1 | 4/2017 |
| KR | 10-2017-0056919 A | 5/2017 |
| KR | 10-2017-0058578 A | 5/2017 |
| KR | 10-2017-0060378 A | 6/2017 |
| KR | 10-2017-0068779 A | 6/2017 |
| KR | 10-1749537 B1 | 6/2017 |
| KR | 10-1749538 B1 | 6/2017 |
| KR | 10-1749643 B1 | 6/2017 |
| KR | 10-1757192 B1 | 7/2017 |
| KR | 10-2017-0093046 A | 8/2017 |
| KR | 10-1762095 B1 | 8/2017 |
| KR | 10-1781211 B1 | 9/2017 |

OTHER PUBLICATIONS

Notice of Preliminary Rejection dated Dec. 20, 2022.
European Search Report Dated Jan. 11, 2022.
Korean Search Report Dated Feb. 23, 2022.
Japanese Office Action dated Jul. 18, 2023.
Indian Office Action dated Sep. 12, 2022.
European Search Report dated Apr. 14, 2022.
Office Action dated Apr. 26, 2022.
European Search Report dated Nov. 27, 2023.
Notice of Patent Grant dated Dec. 5, 2023.
Chinese Notice of Allowance dated Mar. 16, 2024.
Chinese Office Action dated Mar. 28, 2024.
Chinese Notice of Allowance dated Aug. 7, 2024.

\* cited by examiner

ELECTRONIC DEVICE AND COMMUNICATION METHOD USING 4G AND 5G COMMUNICATION BASED ON TEMPERATURE

CROSS-REFERENCE TO RELATED APPLICATION(S)

This application is a Continuation of U.S. patent application Ser. No. 17/326,525, filed on May 21, 2021 which is a Continuation of U.S. patent application Ser. No. 16/198,923 filed on Nov. 23, 2018, and assigned U.S. Pat. No. 11,019,548, issued on May 25, 2021 and based on and claims priority under 35 U.S.C. § 119 from Korean Patent Application No. 10-2017-0158289, filed on Nov. 24, 2017, in the Korean Intellectual Property Office, the disclosure of which is incorporated by reference herein in its entirety.

BACKGROUND

1) Field

Certain embodiments of the present disclosure relate to an electronic device and a communication method thereof.

2) Description of Related Art

An electronic device can provide various functions. For example, the electronic device may provide a voice communication function, a short-range wireless communication (e.g., Bluetooth, Wi-Fi, or near field communication (NFC)), a mobile communication (e.g., $3^{rd}$-generation (3G) or $4^{th}$ generation (4G)), music or video playback, a camera, and/or positioning and navigation.

In recent years, electronic devices that support a variety of high-speed communication mechanisms (e.g., millimeter wave (mmWave) communication {e.g., Wireless Gigabits (WiGig), 802.11ay, or 5G}) capable of transmitting large amounts of data in a short period of time have been developed.

The increasing functions can cause the electronic device to overheat. Accordingly, it is important to prevent overheating and improve the lifetime of the electronic device.

The above information is presented as background information only to assist with an understanding of the present disclosure. No determination has been made, and no assertion is made, as to whether any of the above might be applicable as prior art with regard to the present disclosure.

SUMMARY

When high-speed communication is performed for a long period of time, the electronic device may overheat due to a high data throughput and/or a high current consumption. Due to the overheating of the electronic device, the performance and/or lifetime of components (e.g., a 5G communication processor integrated chip (IC) or a high-speed communication IC such as a WiGig IC) of the electronic device may be shortened. Further, due to the overheating of the electronic device, a user may suffer a low-temperature burn.

An aspect of the present disclosure is to provide an electronic device that may prevent overheating during high-speed communications and a method thereof.

Another aspect of the present disclosure is to provide an electronic device that may perform a handover from high-speed communication to another form of communication when the electronic device overheats due to the high-speed communication, and a method thereof.

In accordance with an aspect of the present disclosure, an electronic device includes a housing comprising a first plate and a second plate facing a direction opposite the first plate; a first transceiver disposed in the housing; a second transceiver disposed in the housing and to having a data throughput lower than that of the first transceiver; at least one processor operatively connected to the first transceiver and to the second transceiver; and a memory operative connected to the at least one processor, wherein the memory stores instructions that, when executed, cause the at least one processor to perform operations comprising: determining whether the data throughput of the first transceiver is equal to or greater than a designated reference value, monitoring a temperature of the first transceiver when the data throughput is equal to or greater than the designated reference value, and determining whether to perform a handover from the first transceiver to the second transceiver based at least in part on whether the monitored temperature is equal to or higher than a first designated reference temperature. In accordance with another aspect of the disclosure, a portable communication device includes one or more temperature sensors; a first transceiver configured to communicate using a first communication protocol; a second transceiver configured to communicate using a second communication protocol; and at least one processor operatively connected to the first transceiver and the second transceiver, wherein the processor performs operations comprising establishing a first communication link between the portable communication device and an external electronic device using the first transceiver, identifying the temperature of the first transceiver using at least one temperature sensor of the one or more temperature sensors while performing wireless communication between the portable communication device and the external electronic device through the first communication connection, and performing a handover, when the temperature of the first transceiver is equal to or higher than a designated temperature, wherein performing the handover comprises establishing a second communication link between the portable communication device and the external electronic device using the second transceiver and terminating the first communication link.

In accordance with still another aspect of the present disclosure, an electronic device includes a first wireless transceiver configured to transmit and/or receive a first signal having a first frequency between 3 GHz and 100 GHz; a second wireless transceiver configured to transmit and/or receive a second signal having a second frequency lower than the first frequency; and a controller, wherein the controller is configured to perform operations comprising: wirelessly communicating first data with an external device using the first wireless transceiver, monitoring usage of the first wireless transceiver while communicating with the external device, and wirelessly communicating second data with the external device using the second wireless transceiver on behalf of the first wireless transceiver, based at least partly on the monitored usage.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Hereinafter, certain embodiments of the present disclosure will be described with reference to the accompanying drawings. The present document is intended to illustrate and not to limit the specific embodiments of the certain embodiments of the present disclosure to the particular forms illustrated and described in the accompanying drawings. For example, it is apparent to those skilled in the art that the embodiments of the present disclosure can be modified in various ways.

Figure 1:
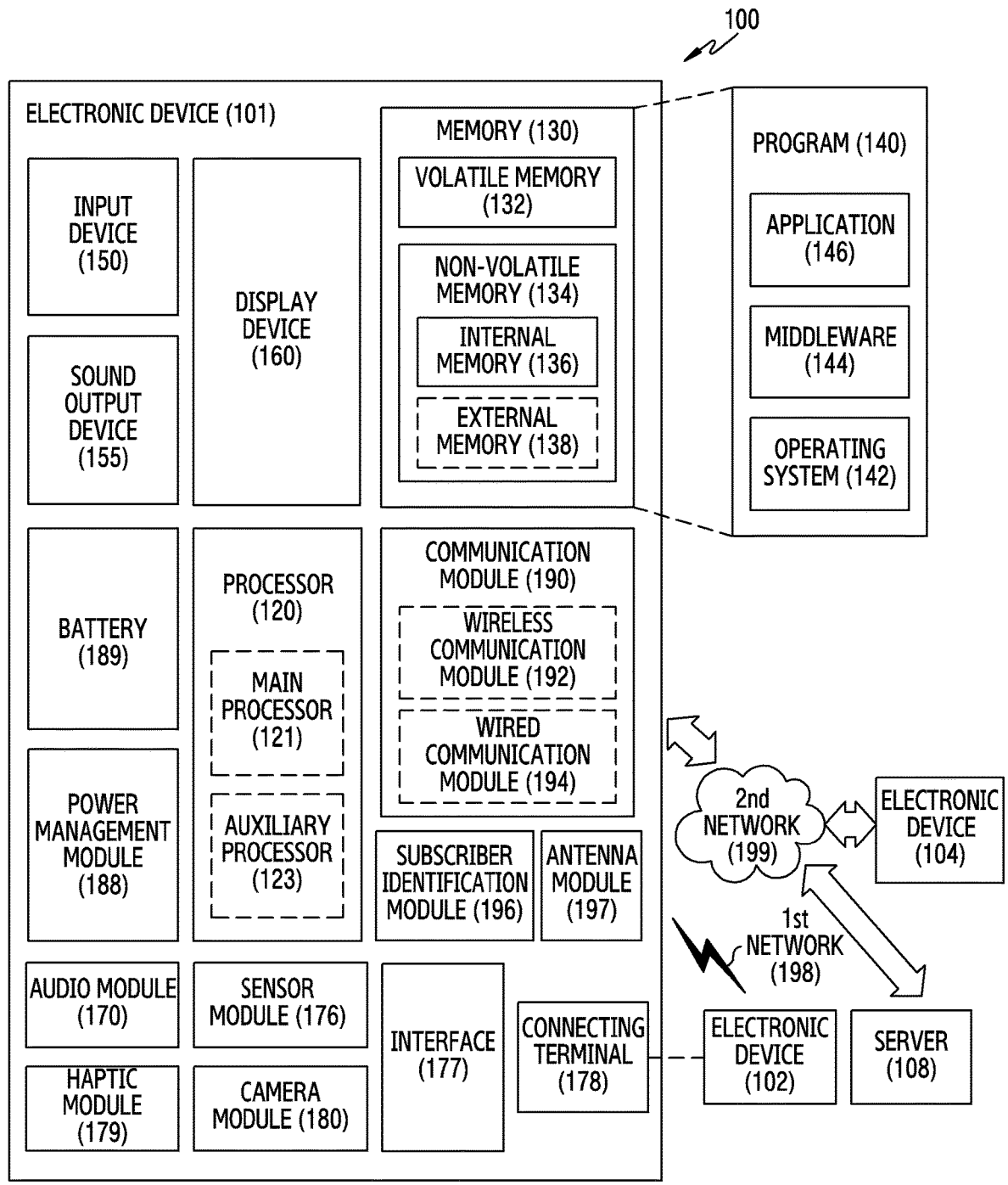
FIG. 1 is a block diagram illustrating an electronic device within a network environment according to an embodiment of the present disclosure.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
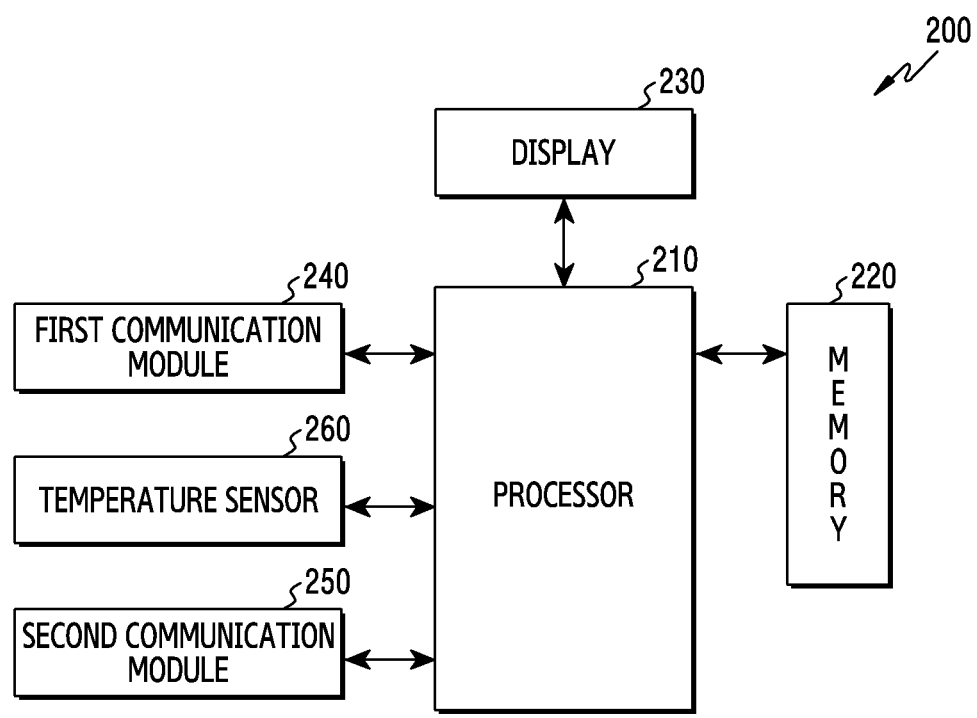
FIG. 2 is a block diagram illustrating an electronic device according to an embodiment of the present disclosure.
Figure 3A:
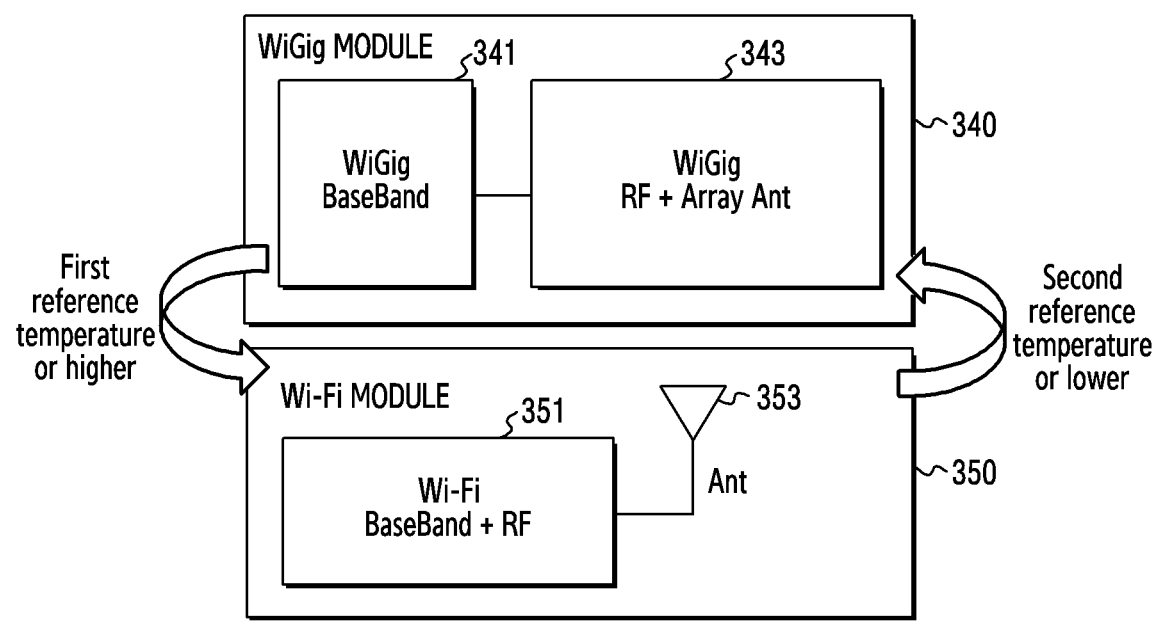
FIG. 3A is a block diagram illustrating a first communication module and a second communication module according to an embodiment of the present disclosure.
Figure 3B:
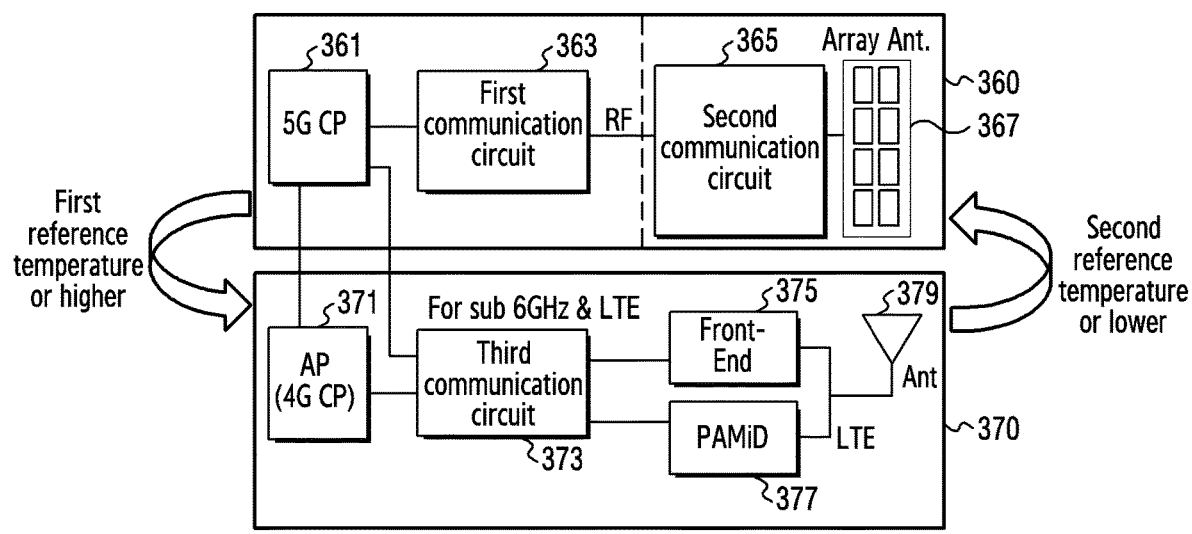
FIG. 3B is a block diagram illustrating a first communication module and a second communication module according to an embodiment of the present disclosure.

FIG. 2 is a block diagram illustrating an electronic device according to an embodiment of the present disclosure, FIG. 3A is a block diagram illustrating a first communication module and a second communication module according to an embodiment of the present disclosure, and FIG. 3B is a block diagram illustrating a first communication module and a second communication module according to another embodiment of the present disclosure. It shall be understood that term communication module as used in this document includes "transceiver."

Referring to FIGS. 2 to 3B, an electronic device 200 (e.g., the electronic device 101) according to an embodiment of the present disclosure may include at least one processor 210 (e.g., the processor 120, hereinafter, shall be referred to as "processor"), a memory 220 (e.g., the memory 130), a display 230 (e.g., the display device 160), a first communication module 240 (e.g., the wireless communication module 192), a second communication module 250 (e.g., the wireless communication module 192), and a temperature sensor 260 (a temperature sensor 260 may include, among other things, a thermometer). The processor 210, the memory 220, the display 230, the first communication module 240, the second communication module 250, and the temperature sensor 260 may be arranged within a housing (not shown) of the electronic device 200. The housing may include a first plate and a second plate facing a direction opposite the direction of the first plate.

According to an embodiment of the present disclosure, the processor 210 may control handover between the first communication module 240 and the second communication module 250. For example, the processor 210 may establish a first communication connection with an external electronic device using the first communication module 240, and may perform wireless communication with the external electronic device through the first communication connection. For purposes of this document, "communication connection" includes a "communication link." A "communication link" includes a wireless link. The processor 210 may monitor (e.g., identify, measure, or estimate) the temperature of the first communication module 240 when the first communication module 240 performs high-speed communication over a designated range (e.g., when the data throughput of the first communication module 240 is equal to or greater than a reference value). According to some embodiments, the processor 210 may monitor the temperature of the first communication module 240 while performing wireless communication with the external electronic device through the first communication connection.

The processor 210 may perform handover from the first communication module 240 to the second communication module 250 when the temperature of the first communication module 240 satisfies (e.g., is higher than (or exceeds)) a first designated temperature (a first reference temperature (e.g., 50 degrees C./122 degrees F.)). For example, the processor 210 may conditionally perform a handover, wherein a second communication connection is established that wirelessly communicates with the external electronic device using the second communication module 250 and the first communication connection is terminated shortly (a minimum amount of time required to verify and notify the external device) after the second communication connection is established, when the monitored (or identified) temperature satisfies the first reference temperature.

According to an embodiment, the processor 210 may conditionally perform the handover with the added condition that a received signal of the second communication module 250 is equal to or greater than (or exceeds) a designated reference electric field (e.g., −90 dBm). A method of monitoring the temperature of the first communication module 240 will be described later with reference to FIGS. 6 to 8.

According to an embodiment of the present disclosure, the processor 210 may turn off the power of the first communication module 240 when performing handover from the first communication module 240 to the second communication module 250. In another example, the processor 210 may reduce service quality (e.g., resolution) based on the performance (e.g., data throughput, data processing amount, or transmission speed) of the second communication module 250. For example, the processor 210 may change from video data having 4K ultra high definition (UHD) image quality, which was transmitted using the first communication module 240, to video data having full HD (FHD) image quality, and may transmit the converted video data to an external device (e.g., TV) using the second communication module 250. According to an embodiment, the processor 210 may provide a user interface providing notification that the service quality has been changed due to the overheating of the electronic device 200.

According to an embodiment of the present disclosure, the processor 210 may monitor the temperature of the first communication module 240 when performing handover to the second communication module 250, and may perform handover from the second communication module 250 to the first communication module 240 when the temperature of the first communication module 240 satisfies (e.g., is equal to or lower than or below) a second designated temperature (a second reference temperature (e.g., 30 degrees C./88 degrees F.)), which is lower than the first designated temperature. According to an embodiment, the second reference temperature may be set equal to the first reference temperature. According to an embodiment, the processor 210 may perform handover from the second communication module 250 to the first communication module 240 when a received signal of the first communication module 240 is equal to or greater than (or exceeds) the designated reference electric field (e.g., −90 dBm).

According to an embodiment of the present disclosure, the processor 210 may restore the service quality when performing handover from the second communication module 250 to the first communication module 240. For example, the processor 210 may transmit the video data with 4K UHD image quality, other than the video data with FHD image quality, to the external device using the first communication module 240. According to an embodiment, the processor 210 may provide a user interface providing notification that handover from the second communication module 250 to the first communication module 240 has been performed.

According to an embodiments of the present disclosure, the reference temperature for the handover may be set differently for each application (app), function, or service. For example, even if the temperature of the first communication module 240 satisfies the first reference temperature during a designated app that a real-time communication is important (or required) is executing, the processor 210 does not perform handover to the second communication module 250 until a third designated temperature (a third reference temperature) (e.g., 60 degrees) is satisfied, and may communicate with the external electronic device via the first communication module 240. The third reference temperature is equal to or greater than the first reference temperature.

According to an embodiments of the present disclosure, the processor 210 may not handover to the second communication module 250 based on a remaining time until an end of the first communication connection even if the temperature of the first communication module 240 satisfies the first reference temperature. For example, if the temperature of the first communication module 240 satisfies the first reference temperature during the first communication module 240 is used to stream a high-quality moving image or download large-capacity data, the processor 210 may determine a remaining time until the streaming or download is ended, and not hand over to the second communication module 250 if the determined time is less than (or less than) a designated time (e.g., 3 minutes).

According to an embodiment of the present disclosure, the memory 220 may be operatively (or functionally) connected to the processor 210. The memory 220 may store various programs for operating the electronic device 200, and may store data generated or downloaded while performing the various programs. In another example, the memory 220 may store various commands and/or instructions for execution by the processor 210 causing the processor to perform various operations. The memory 220 may include at least one of an internal memory and an external memory. For example, the memory 220 may store a program code, instruction(s), and/or a command(s) for preventing overheating of the electronic device 200 through handover.

According to an embodiment of the present disclosure, the memory 220 may store a look-up table for controlling the handover of the electronic device 200. For example, the look-up table may include a first look-up table (Table 1) that stores reference conditions for performing handover from the first communication module 240 to the second communication module 250 and a second look-up table (Table 2) that stores reference conditions for performing handover from the second communication module 250 to the first communication module 240.

TABLE 1

| Parameter | Reference conditions |
| --- | --- |
| Temperature | 50 degrees C./122 degrees F. (first reference temperature) |
| Data throughput and operating time | Operating at throughput of 2 Gbps for 30 minutes or more |
| Current consumption and operating time | Current consumption of 400 mA or more continues for 30 minutes or more |
| Operating time | First communication module operates for 1 hour or more |

TABLE 2

| Parameters | Reference conditions |
| --- | --- |
| Temperature | 30 degrees C./88 degrees F.(second reference temperature) |
| Time | 20 minutes (off time of first communication module) |

Table 1 and Table 2 are merely examples, and are not limited to the embodiments of the present disclosure. For example, the first reference temperature and the second reference temperature may be set as the same value or within a sufficient threshold of each other (5 degrees C./9 degrees F.) to prevent excessive handovers due to minimal variations. In another example, the first look-up table may include only some of the four reference conditions of Table 1. In still another example, the first look-up table may further include other reference conditions (e.g., operating at a throughput of 3 Gbps for 20 minutes or more, or a current consumption of 500 mA or more continues for 15 minutes or more). According to an embodiment, the second look-up table may include some of the reference conditions of Table 2, or may further include other reference conditions.

According to an embodiment of the present disclosure, the display 230 may be exposed to the outside through a part of the housing and may provide an output function. For example, the display 230 may be formed of a liquid crystal display (LCD), a light-emitting diode (LED) display, an organic light-emitting diode (OLED) display, a micro electro mechanical system (MEMS) display, or an electronic paper display. According to an embodiment, the display 230 may include a touch panel (not shown) that senses a touch input. For example, the touch panel may sense (or recognize) a change in physical characteristics (capacitance or frequency) by various touch inputs (e.g., tap, double tap, touch, touch movement, multi-touch, pressure touch, etc.) using an input tool such as a finger or a stylus pen, and may transmit the sensed change to the processor 210. The touch panel may further include a first panel (not shown) for sensing a touch using a finger, a second panel (not shown) for recognizing the stylus pen, and/or a third panel (not shown) for sensing pressure. According to an embodiment, a partial region of the touch panel may be set as a region for fingerprint recognition.

According to an embodiment of the present disclosure, the display 230 may display the same screen as a screen which is currently transmitted to an external device. The display 230 may display a user interface screen providing notification that handover from the first communication module 240 to the second communication module 250 or handover from the second communication module 250 to the first communication module 240 has been performed. According to an embodiment, the display 230 may display a user interface providing notification that the service quality (e.g., resolution) has been changed.

According to an embodiment, the first communication module 240 may be located within the housing, and may support a first communication protocol (e.g., mmWave communication). For example, the first communication module 240 may be a WiGig (or 802.11ay) module 340, as shown in FIG. 3A. In another example, the first communication module 240 may be a 5G new radio (NR) communication module 360 as shown in FIG. 3B. The first communication module 240 may transmit and/or receive a first signal having a first frequency between 3 GHz and 100 GHz.

According to an embodiment, the second communication module 250 may support a second communication protocol and may have a lower data throughput (e.g., lower speed, lower bandwidth, lower heat generation, and/or lower power) compared to the first communication module 240. For example, the second communication module 250 may be a Wi-Fi module 350, as shown in FIG. 3A. In another example, the second communication module 250 may be a cellular communication module, such as a long-term evolution (LTE) module 370, as shown in FIG. 3B. The second communication module 250 may transmit and/or receive a second signal having a second frequency lower than the first frequency.

According to an embodiment, a handover may be performed between the first communication module 240 and the second communication module 250. For example, referring to FIG. 2 and FIG. 3A, the electronic device 200 may establish a link for wireless communication with an external device through the first communication module 240 (e.g., the WiGig module 340), and may provide mirroring services. For example, the electronic device 200 may transmit video data of 4K UHD to the external device through the first communication module 240 (e.g., the WiGig module 340). When the temperature of the first communication module 240 (the WiGig module 340) increases to the first reference temperature (e.g., 50 degrees C./122 degrees F.) or higher, the electronic device 200 may perform handover from the first communication module 240 (the WiGig module 340) to the second communication module 250 (e.g., a Wi-Fi module 350), and when the temperature of the first communication module 240 (the WiGig module 340) decreases to the second reference temperature (e.g., 30 degrees C./88 degrees F.) or lower, the electronic device 200 may perform handover from the second communication module 250 (the Wi-Fi module 350) to the first communication module 240 (the WiGig module 340) again. In some embodiments, the electronic device 200 may control handover between the first communication module 240 (the WiGig module 340) and the second communication module 250 (the Wi-Fi module 350) based on one reference temperature.

Referring to FIGS. 2 and 3A, the WiGig module 340 may include, for example, a WiGig baseband module 341 and a WiGig integration module 343 in which a communication circuit and an array antenna are integrated. The Wi-Fi module 350 may include, for example, a Wi-Fi integration module 351 in which a baseband and a communication circuit are integrated and an antenna 353. For example, the WiGig module 340 and the Wi-Fi module 350 may be separate components. In another example, the WiGig module 340 and the Wi-Fi module 350 may be mounted at different positions. FIG. 3A is only an example, and is not limited to the embodiment of the present disclosure.

Referring to FIGS. 2 and 3B, the electronic device 200 according to an embodiment may perform handover from the first communication module 240 (e.g., a 5G NR communication module 360) to the second communication module 250 (e.g., an LTE module 370) when the temperature of the first communication module 240 (e.g., 5G NR communication module 360) increases to the first reference temperature or higher while transmitting data through the first communication module 240 (e.g., the 5G NR communication module 360), and may perform handover from the second communication module 250 (e.g., the LTE module 370) to the first communication module 240 (e.g., 5G NR communication module 360) again when the temperature of the first communication module 240 (e.g., the 5G NR communication module 360) decreases to the second reference temperature or lower in the handover state. According to some embodiments, the electronic device 200 may control handover between the first communication module 240 (e.g., the 5G NR communication module 360) and the second communication module 250 (e.g., the LTE module 370) based on one designated temperature.

According to an embodiment, the 5G NR module 360 may include a 5G communication processor (CP) 361 that supports a 5G communication specification (or protocol), a first communication circuit 363 (e.g., IFIC) that converts a baseband signal into a signal in an intermediate frequency (e.g., 11 GHz) band or converts a signal in the intermediate frequency band into a baseband signal, a second communication circuit 365 (e.g., RFIC) that converts a signal in an intermediate frequency band into a signal in a radio-frequency (e.g., 28 GHz) band or converts a signal in a radio-frequency band into a signal in an intermediate frequency band, and an array antenna 367.

According to an embodiment, the LTE module 370 may include an AP 371 including a 4G CP, a third communication circuit (e.g., transceiver) 373, a front-end 375, a power amplifier module integrated duplexer (PAMid) 377, and an antenna 379.

According to an embodiment, the 5G NR communication module 360 and the LTE module 370 may be separate components, and may be mounted at different positions. FIG. 3B is an only example, and is not intended to limit the embodiment of the present disclosure. For example, in FIG. 3B, the third communication circuit 373 processes wireless signals in a sub 6 GHz band and an LTE band. However, a transceiver for processing wireless signals in the sub 6 GHz band may be formed separately. In another example, the 4G CP may be formed separately from the AP 371.

According to an embodiment of the present disclosure, the temperature sensor 260 may be located around the first communication module 240 to measure the temperature of the first communication module 240. For example, the temperature sensor 260 may be a thermistor whose resistance value varies according to the temperature. However, the embodiments of the present disclosure are not limited thereto, and various temperature sensors may be used.

According to an embodiment, the temperature sensor 260 may be activated when the data throughput of the first communication module 240 is equal to or higher than a reference value. According to an embodiment, the temperature sensor 260 may be omitted. For example, when the processor 210 estimates the temperature using at least one of a data throughput, an operating time, and/or a current consumption of the first communication module 240, the temperature sensor 260 may be omitted.

An electronic device (e.g., the electronic device 101 or the electronic device 200) according to certain embodiments of the present disclosure may include a housing configured to include a first plate and a second plate facing a direction opposite the first plate; a first transceiver (e.g., the first communication module 240, the WiGig module 340, or the 5G NR module 360) configured to be disposed in the housing; a second transceiver (e.g., the second communication module 250, the Wi-Fi module 350, or the LTE module 370) configured to be disposed in the housing and to have a data throughput lower than that of the first transceiver; at least one processor (e.g., the processor 120 or processor 210) operatively connected to the first transceiver and to the second transceiver; and a memory (e.g., the memory 130 or memory 220) configured operatively connected to the processor, wherein the memory may store, when executed, instructions that cause the processor to perform operations comprising determining whether the data throughput of the first transceiver is equal to or greater than a designated reference value, monitoring the temperature of the first transceiver when the data throughput is equal to or greater than the designated reference value, and to determining whether to perform a handover from the first transceiver to the second transceiver based at least in part on whether the monitored temperature is equal to or higher than a first designated reference temperature.

According to certain embodiments, the operations may further comprise determining whether the intensity of a received signal of the second transceiver is equal to or greater than a designated reference electric field, performing the handover when the intensity of the received signal of the second transceiver is equal to or more than the designated reference electric field, and to maintaining data communication through the first transceiver when the intensity of the received signal of the second transceiver is less than the designated reference electric field.

According to certain embodiments, the operations may further comprise periodically monitoring the temperature of the first transceiver after performing handover, and determining whether to perform a handover from the second transceiver back to the first transceiver based at least in part on whether the temperature of the first transceiver decreases to a designated second reference temperature or lower.

According to certain embodiments, the operations may further comprise determining whether the intensity of a received signal of the first transceiver is equal to or greater than that of a designated reference electric field when the temperature of the first transceiver decreases to the second reference temperature or lower, to perform handover from the second transceiver to the first transceiver when the intensity of the received signal of the first transceiver is equal to or greater than that of the reference electric field, and to maintain data communication through the second transceiver when the intensity of the received signal of the first transceiver is less than that of the reference electric field.

According to certain embodiments, the electronic device may further include a display (e.g., the display device 160 or the display 230), and the operations may further comprise displaying, on the display, performed handover notification.

According to certain embodiments, the instructions may cause the processor to adjust the quality of data communication based on the performance of the second transceiver while performing the handover.

According to certain embodiments, the electronic device may further include a temperature sensor (e.g., the temperature sensor 260), and the operations may further comprise periodically measuring the temperature of the first transceiver through the temperature sensor.

According to certain embodiments, the operations may further comprise determining whether the operating time of the first transceiver is equal to or longer than a designated reference time, and determining that the temperature of the first transceiver is equal to or higher than a first reference temperature when the operating time of the first transceiver is equal to or longer than the reference time.

According to certain embodiments, the operations may further comprise measuring the current consumption of the first transceiver, identifying the operating time of the first transceiver when the measured current consumption exceeds a designated reference current, and determining that the temperature of the first transceiver is equal to or higher than the first reference temperature when the operating time of the first transceiver is equal to or longer than the designated reference time.

According to certain embodiments, the first transceiver may be a WiGig transceiver (e.g., the WiGig module 340) supporting a WiGig protocol, and the second transceiver may be a Wi-Fi transceiver (e.g., the Wi-Fi module 350) supporting a Wi-Fi protocol.

According to certain embodiments, the first transceiver may be a 5G NR communication module (e.g., the 5G NR module 360), and the second transceiver may be an LTE communication module (e.g., the LTE module 370).

According to certain embodiments, the memory may store a table that stores reference conditions for handover between the first transceiver and the second transceiver.

A portable communication device (e.g., the electronic device 101 or the electronic device 200) according to certain embodiments of the present disclosure may include one or more temperature sensors (e.g., the temperature sensor 260); a first transceiver (e.g., the first communication module 240, the WiGig module 340, or the 5G NR module 360) configured to support a first communication protocol; a second transceiver (e.g., the second communication module 250, Wi-Fi module 350, or LTE module 370) configured to support a second communication protocol; and at least one processor (e.g., the processor 120 or processor 210) operatively connected to the first transceiver and the second transceiver, wherein the at least one processor performs operations comprising establish a first communication link between the portable communication device and an external electronic device using the first transceiver; identifying the temperature of the first transceiver using at least one temperature sensor of the one or more temperature sensors while performing wireless communication between the portable communication device and the external electronic device through the first communication connection; and performing a handover, when the temperature of the first transceiver is equal to or higher than a designated temperature, wherein performing the handover comprises establishing a second communication link between the portable communication device and the external electronic device using the second transceiver and terminating the first communication link.

According to certain embodiments, the operations may further comprise determining whether a data throughput of the first transceiver is equal to or greater than a designated reference value, and to identify the temperature of the first transceiver when the data throughput of the first transceiver is equal to or greater than the reference value.

According to certain embodiments, wherein identifying the temperature of the first transceiver further comprises identifying the temperature of the first transceiver based on the operating time of the first transceiver.

According to certain embodiments, the wherein identifying the temperature of the first transceiver identifying the temperature of the first transceiver based on a current consumption by the first transceiver.

According to certain embodiments, the designated temperature may include a first designated temperature and a second designated temperature, and the operations further comprise performing handover when the identified temperature satisfies the first designated temperature, and performing another handover when the temperature of the first transceiver satisfies the second designated temperature while wireless communication is performed between the portable electronic device and the external electronic device through the second communication connection, wherein the another handover comprises re-establishing the first communication link and terminating the second communication link.

An electronic device (e.g., the electronic device 101 or the electronic device 200) according to certain embodiments of the present disclosure may include a first wireless transceiver (e.g., the first communication module 240, WiGig module 340, or 5G NR module 360) configured to transmit and/or receive a first signal having a first frequency between 3 GHz and 100 GHz; a second wireless transceiver (e.g., the second communication module 250, Wi-Fi module 350, or LTE module 370) configured to transmit and/or receive a second signal having a second frequency lower than the first frequency; and a control circuit (e.g., the processor 120 or the processor 210), a controller, wherein the controller is configured to perform operations comprising wirelessly communicating first data with an external device using the first wireless transceiver, monitoring the usage of the first wireless transceiver while communicating with the external device, and to wirelessly communicating second data with the external device using the second wireless transceiver on behalf of the first wireless transceiver, based at least partly on the monitored usage.

According to certain embodiments, the second wireless transceiver may support Wi-Fi or cellular communication.

According to certain embodiments, wherein the operations further comprise performing a first determination as to whether data throughput through the first wireless transceiver exceeds a designated data throughput, and to monitor the usage based at least partly on the result of the first determination.

According to certain embodiments, the operations further comprise performing a second determination as to whether the monitored usage exceeds a designated usage, and performing a third determination as to whether the intensity of a signal detected by the second wireless communication module exceeds a designated strength based at least partly on the result of the second determination.

According to certain embodiments, the operations further comprise performing a handover to wirelessly communicate with the external device using the second wireless transceiver on behalf of the first wireless transceiver, based at least partly on the result of the third determination, and the first data may include video data having a first resolution and the second data may include video data having a second resolution smaller than the first resolution.

According to certain embodiments, the control circuit may be configured to monitor the usage based on at least one of an operating time, a data throughput, and a current consumption of the first wireless communication module.

According to certain embodiments, the first resolution may be a UHD, and the second resolution may be an FHD.

An electronic device (e.g., the electronic device 101 or electronic device 200) according to certain embodiments of the present disclosure may include a first wireless communication module (e.g., the first communication module 240, WiGig module 340, or 5G NR module 360) configured to transmit and/or receive a first signal having a first frequency between 3 GHz and 100 GHz; a second wireless communication module (e.g., the second communication module 250, Wi-Fi module 350, or LTE module 370) configured to transmit and/or receive a second signal having a second frequency lower than the first frequency; and a control circuit (e.g., the processor 120 or processor 210), wherein the control circuit may be configured to wirelessly communicate first data with an external device using the first wireless communication module, to monitor the temperature of the electronic device while communicating with the external device, and to wirelessly communicate second data with the external device using the second wireless communication module on behalf of the first wireless communication module, based at least partly on the monitored temperature.

According to certain embodiments, monitoring further comprises monitoring the temperature based on at least one of at least one temperature sensor, an operating time, a data throughput, and a current consumption of the first wireless communication module.

Figure 4:
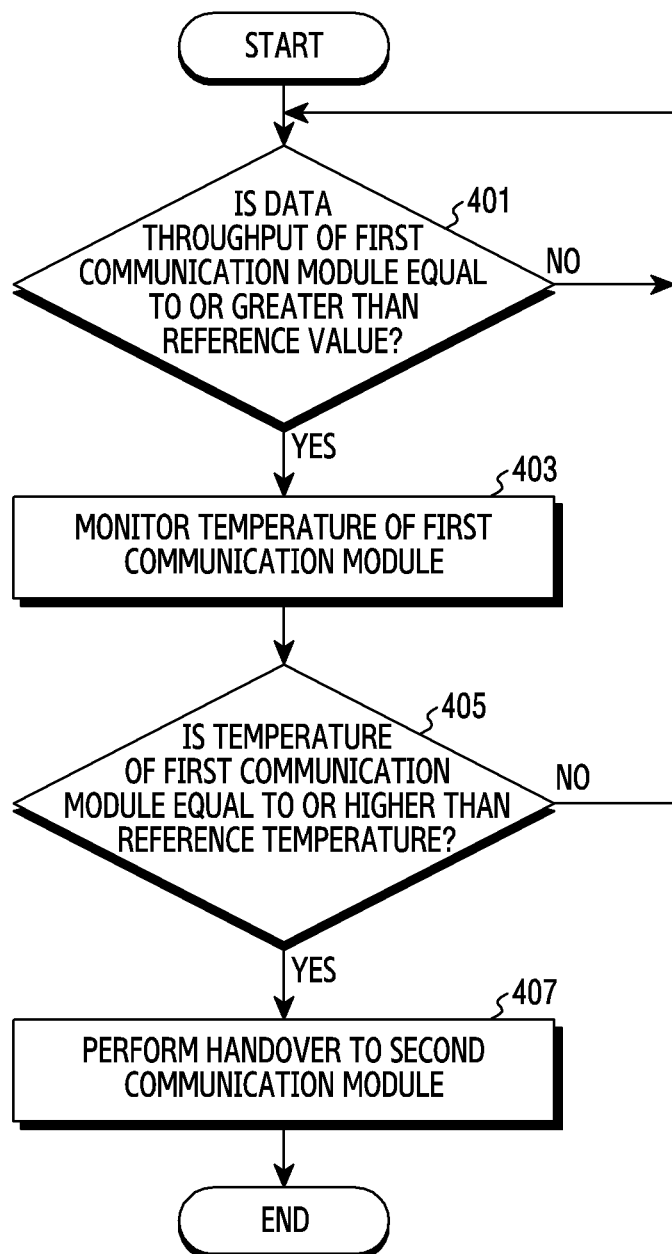
FIG. 4 is a flowchart illustrating a communication operation of an electronic device according to an embodiment of the present disclosure.

FIG. 4 is a flowchart illustrating a communication operation of an electronic device according to an embodiment of the present disclosure.

Prior to a detailed description thereof, an electronic device (e.g., the electronic device 101 or electronic device 200) may be in a state of establishing a first communication connection with an external device using a first communication module (e.g., the first communication module 240, WiGig module 340, or 5G NR module 360). For example, a processor (e.g., the processor 120 or processor 210) of the electronic device may wirelessly communicate first data with the external device using the first communication module.

Referring to FIG. 4, in operation 401, the processor of the electronic device according to an embodiment of the present disclosure may determine whether the data throughput of the first communication module is equal to or greater than (or exceeds) a designated reference value. For example, the processor may periodically determine whether the data throughput of the first communication module is equal to or greater than the reference value while providing a mirroring service using an external device directly connected in a wireless manner or an external device (e.g., the display device such as a TV or a monitor) indirectly connected through a dongle device (not shown). According to an embodiment, the processor may transmit data (e.g., video) of a first service quality (e.g., UHD resolution) to the external device.

When the data throughput of the first communication module is less than (or equal to or less than) the reference value based on the determination result of operation 401, the processor may continue operation 401. On the other hand, when the data throughput of the first communication module is equal to or greater than (or exceeds) the reference value based on the determination result of operation 401, the processor may monitor (e.g., identify, measure, or estimate) the temperature of the first communication module in operation 403.

In some embodiments, operation 401 may be omitted. For example, the processor may monitor the temperature of the first communication module while the electronic device and the external device perform wireless communication through the first communication connection established between the electronic device and the external device using the first communication module.

According to an embodiment, the temperature of the first communication module may be monitored in various methods. For example, the processor may periodically measure the temperature of the first communication module using at least one of at least one temperature sensor disposed in the housing (e.g., around the first communication module). In another example, the processor may estimate the temperature of the first communication module in consideration of at least one of the data throughput, operating time, and current consumption of the first communication module.

In operation 405, the processor according to an embodiment of the present disclosure may determine whether the temperature of the first communication module (or electronic device) is equal to or higher than (or exceeds) a designated reference temperature (e.g., 50 degrees C./122 degrees F.). In some embodiments, the processor may determine whether the temperature of the first communication module (or electronic device) satisfies the reference temperature. When the temperature of the first communication module is less than (or equal to or lower than) the reference temperature based on the determination result of operation 405, the processor may proceed to operation 401. On the other hand, when the temperature of the first communication module is equal to or higher than (or exceeds) the reference temperature, the processor may perform handover to a second communication module (e.g., the second communication module 250, the Wi-Fi module 350, or the LTE module 370) in operation 407. For example, the processor may seamlessly transmit data, which has been transmitted to the external device through the first communication module, to the external device through the second communication module. According to an embodiment, the processor may turn off the power of the first communication module to quickly cool the heated first communication module. According to an embodiment, the processor may change the service quality while performing handover to transmit data to the external device. For example, the processor may change video data (first data) of a UHD resolution to video data (second data) of an MD resolution based on the performance (e.g., data throughput, bandwidth, or transmission speed) of the second communication module and may transmit the result. According to an embodiment, the processor may provide a user with notification of a change in the service quality.

In FIG. 4, handover between the first communication module and the second communication module may be performed based at least partly on the temperature of the first communication module. However, according to an embodiment, the processor may periodically identify the usage of the first communication module, which is wirelessly and communicably connected to the external device, and may perform handover between the first communication module and the second communication module based at least partly on the identified usage.

According to an embodiments of the present disclosure, the first reference temperature for the handover may be set differently for each application (app), function, or service. Even if the temperature of the first communication module 240 satisfies the first reference temperature, at least one App may be set to do not perform handover to the second communication module 250, or to perform handover when the temperature of the first communication module 240 satisfies the third reference temperature that is equal to or greater than the first reference temperature.

According to an embodiments of the present disclosure, the processor 210 may control whether performing handover to the second communication module 250 based on a remaining time until an end of the first communication connection even if the temperature of the first communication module 240 satisfies the first reference temperature.

Figure 5A:
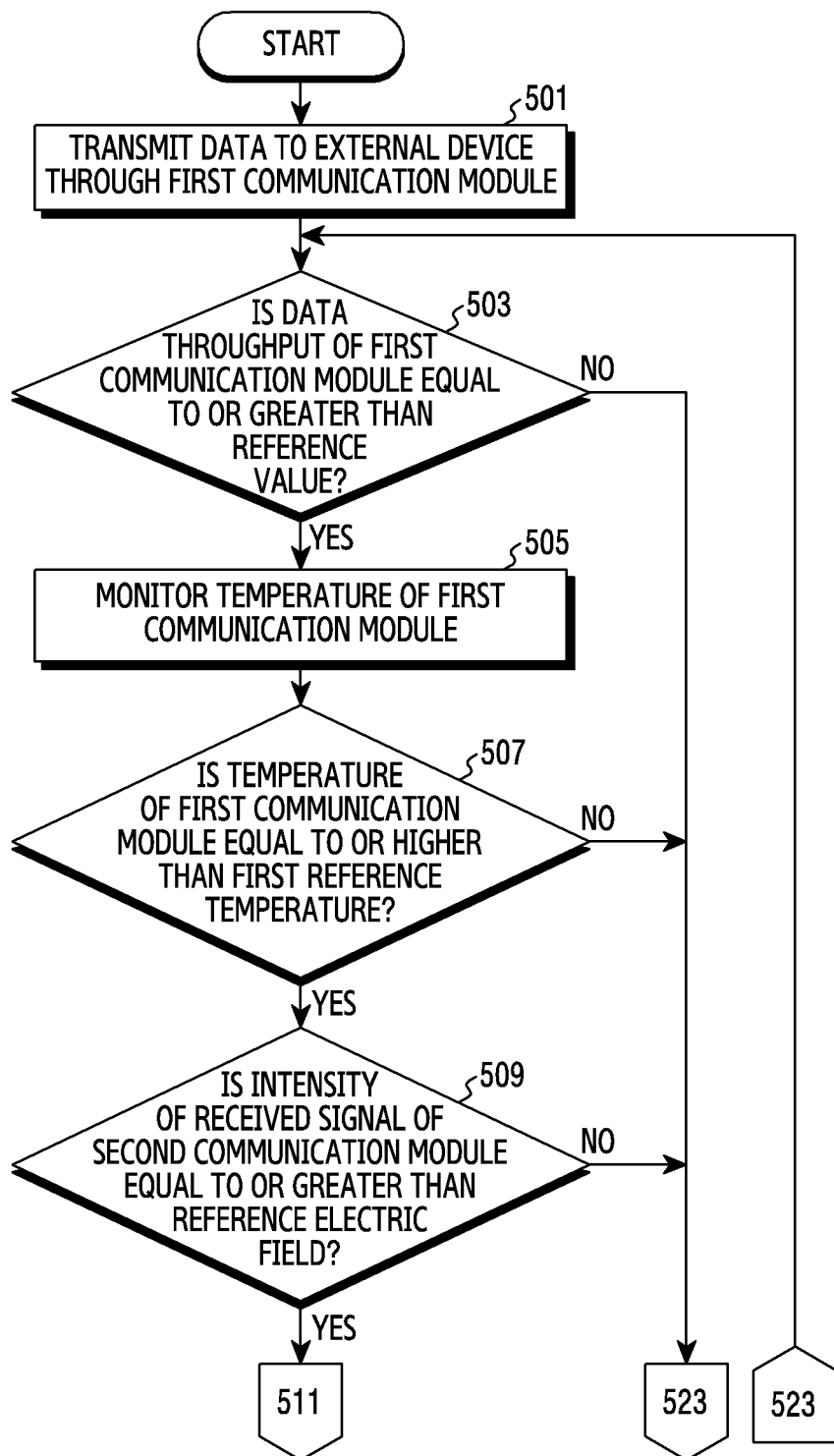
FIG. 5A and FIG. 5B are flowcharts illustrating a communication operation of an electronic device according to an embodiment of the present disclosure.
Figure 5B:
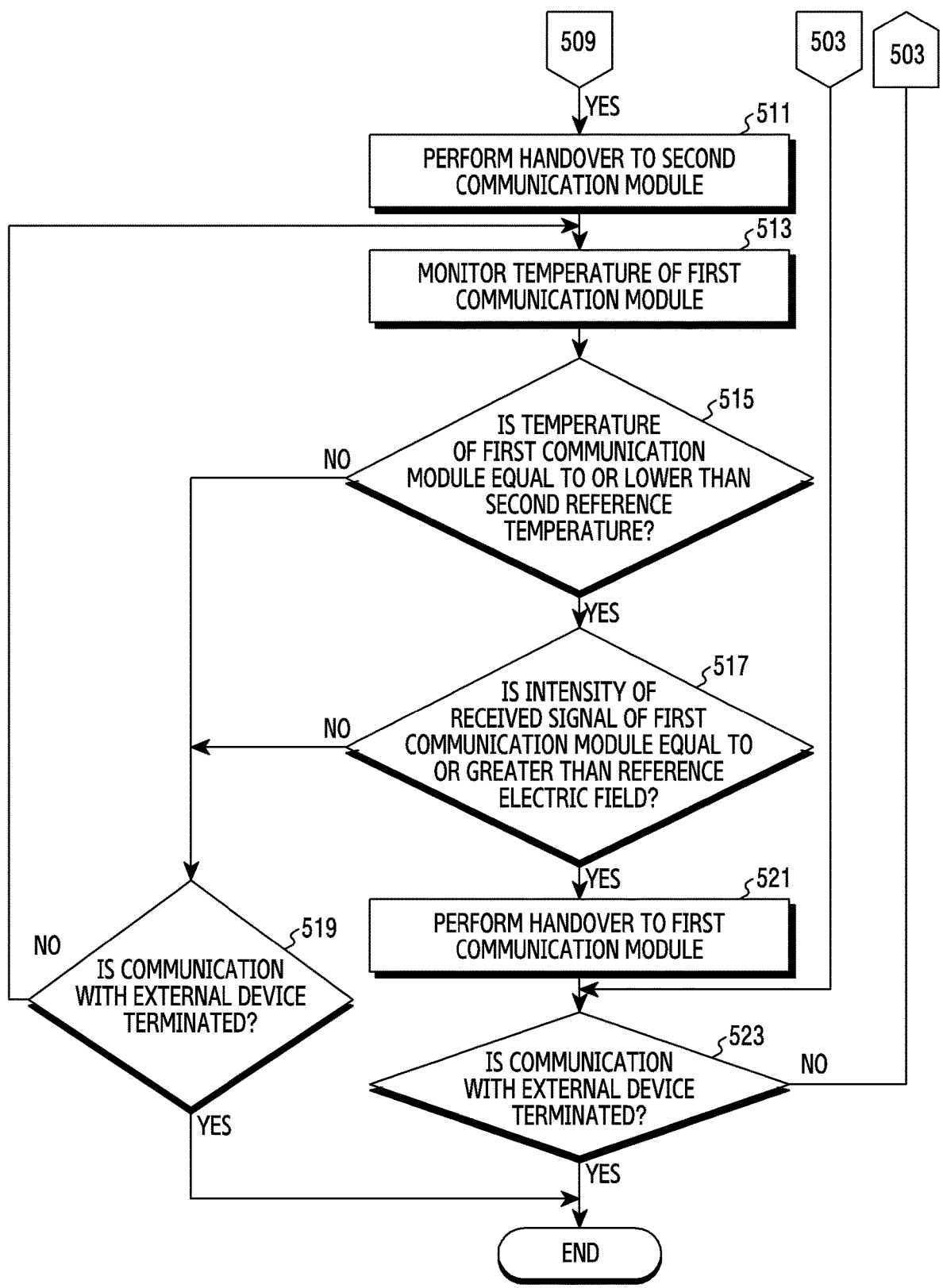
Figure 5C:
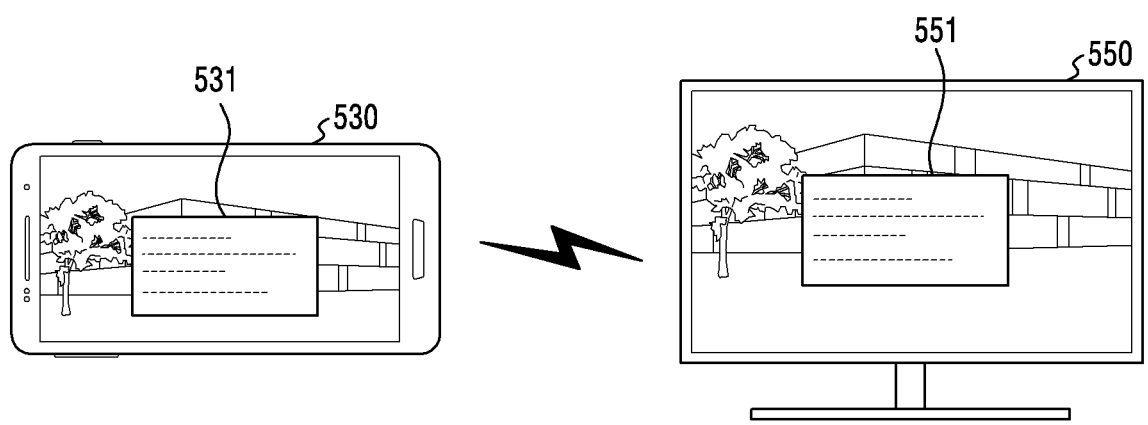
FIG. 5C is an exemplary diagram illustrating an example of notifying a user of handover of an electronic device according to an embodiment of the present disclosure.

FIGS. 5A and 5B are flowcharts illustrating a communication operation of an electronic device according to an embodiment of the present disclosure, and FIG. 5C is an exemplary diagram illustrating an example of notifying a user of handover of an electronic device according to an embodiment of the present disclosure.

FIG. 5C is a block diagram describing a smartphone 530 transmitting video data to a television or display device 550. The smartphone 530 is capable of transmitting UHD resolution video and the display device 550 is capable of displaying UHD resolution video.

Referring to FIGS. 5A to 5C, in operation 501, a processor (e.g., the processor 120 or the processor 210) of an electronic device (e.g., the electronic device 101 or the electronic device 200) according to an embodiment of the present disclosure may transmit data to an external device (e.g., the display device such as a TV or a monitor) through a first communication module (e.g., the first communication module 240, WiGig module 340, or 5G NR module 360). For example, the processor of the electronic device (such as a smartphone 530) may be directly connected to the external device (such as a television or display device 550) in a wireless manner or may be indirectly connected to the external device through a dongle device (not shown) to provide a mirroring service. For example, the electronic device may transmit data (e.g., video) of a first service quality (e.g., a UHD resolution) to the external device, by for example, casting.

According to an embodiment of the present disclosure, in operation 503, the processor may determine whether the data throughput of the first communication module is equal to or greater than (or exceeds) a designated reference value (such as UHD throughput). When the data throughput of the first communication module is less than (equal to or less than) the reference value based on the determination result of operation 503, the processor may proceed to operation 523, to be described later. On the other hand, when the data throughput of the first communication module is equal to or greater than (or exceeds) the reference value based on the determination result of operation 503, the processor may monitor (or measure or estimate) the temperature of the first communication module in operation 505. According to an embodiment, the temperature of the first communication module may be monitored in various methods. For example, the processor may periodically measure the temperature of the first communication module using a temperature sensor, such as a thermometer. In another example, the processor may estimate the temperature of the first communication module in consideration of the data throughput, operating time, and current consumption of the first communication module.

In some embodiments, operation 503 may be omitted. For example, the processor may perform operation 505 while the electronic device and the external device perform wireless communication regardless of the data throughput of the first communication module.

In operation 507, the processor according to an embodiment of the present disclosure may determine whether the temperature of the first communication module is equal to or higher than (or exceeds) a designated first reference temperature (e.g., 50 degrees C./122 degrees F.).

When the temperature of the first communication module is less than (or equal to or less than) the designated first reference temperature based on the determination result of operation 507, the processor may proceed to operation 523 to be described later. On the other hand, when the temperature of the first communication module is equal to or higher than (or exceeds) the designated first reference temperature based on the determination result of operation 507, the processor may determine whether the intensity (or strength) of a received signal of a second communication module (e.g., the second communication module 250, the Wi-Fi module 350, or the LTE module 370) is equal to or greater than (or exceeds) a designated reference electric field (e.g., −90 dBm) in operation 509.

When the intensity of the received signal of the second communication module is less than (or equal to or less than) the reference electric field based on the determination result of operation 509, the processor may proceed to operation 523 to be described later. On the other hand, when the intensity of the received signal of the second communication module is equal to or greater than (or exceeds) the reference electric field, the processor may perform handover of a communication connection with the external device to the second communication module (e.g., the second communication module 250, the Wi-Fi module 350, or the LTE module 370) in operation 511. For example, the processor may transmit data, which has been transmitted to the external device through the first communication module, to the external device through the second communication module. According to an embodiment, the processor may turn off the power of the first communication module to quickly cool the heat of the first communication module. According to an embodiment, the processor may change the service quality while performing handover to transmit data to the external device. For example, the processor may change video data of a UHD resolution to video data of an FHD resolution based on the performance (e.g., transmission speed) of the second communication module, and may transmit the result.

According to an embodiment, the processor may provide a user with notification of a change in the service quality. For example, the processor may display a message 531 or 551 for providing notification that the resolution of the video has been changed to an FHD due to the handover, on the display of the electronic device 530 and/or an external device 550, as shown in FIG. 5C.

In operation 513, the processor according to an embodiment of the present disclosure may monitor the temperature of the first communication module after completing the handover. For example, the processor may periodically measure the temperature of the first communication module using the temperature sensor. In another example, the processor may estimate the temperature of the first communication module over time. For example, the processor may count a handover operating time (e.g., a non-operating time of the first communication module) by activating a timer at the time of performing handover.

In operation 515, the processor according to an embodiment of the present disclosure may determine whether the temperature of the first communication module is equal to or lower than (or below) a designated second reference temperature (e.g., 30 degrees). For example, the processor may determine whether the temperature of the first communication module, measured through the temperature sensor, is equal to or lower than the second reference temperature. In another example, the processor may determine whether the counted handover operating time is equal to or longer than (exceeds) a designated reference time (e.g., 20 minutes). The processor may determine (or confirm or estimate) that the temperature of the first communication module is equal to or lower than the second reference temperature when the handover operating time is equal to or longer than the reference time.

When the temperature of the first communication module exceeds (or is equal to or higher than) the second reference temperature (e.g., 30 degrees C./88 degrees F.) based on the determination result of operation 515, the processor may proceed to operation 519 to be described later. On the other hand, when the temperature of the first communication module is equal to or lower than (or below) the second reference temperature (e.g., 30 degrees C./88 degrees F.) based on the determination result of operation 515, the processor may determine whether the intensity of a received signal of the first communication module is equal to or more than (or exceeds) a designated reference electric field in operation 517. According to an embodiment, the processor may further include an operation of turning on the power of the first communication module before performing operation 517.

When the intensity of the received signal of the first communication module is less than (or equal to or less than) the reference electric field based on the determination result of operation 517, the processor may determine whether communication with the external device is terminated in operation 519. When the communication with the external device is not terminated based on the determination result of operation 519, the processor may return to operation 513. On the other hand, when the communication with the external device is terminated based on the determination result of operation 519, the processor may terminate a communication operation according to an embodiment of the present disclosure.

When the intensity of the received signal of the first communication module is equal to or more than (exceeds) the reference electric field based on the determination result of operation 517, the processor may perform handover of data communication using the second communication module to the first communication module in operation 521.

In operation 523, the processor according to an embodiment of the present disclosure may determine whether the communication with the external device is terminated. When the communication with the external device is not terminated based on the determination result of operation 523, the processor may return to operation 503. On the other hand, when the communication with the external device is terminated based on the determination result of operation 523, the processor may terminate the communication operation according to an embodiment of the present disclosure.

According to an embodiment, the processor of the electronic device may omit operations 509 and 517, and may perform handover regardless of the intensity of the received signal. According to another embodiment, in operation 509, when the intensity of a signal received by the second communication module is equal to or less than that of a reference electric field, the processor of the electronic device may not perform handover and may display a warning message for notifying a user that the electronic device is in an overheated state.

According to an embodiment, before performing operation 511 or 521, the processor of the electronic device may display a message asking whether to perform handover to the second communication module or the first communication module, on the display, and may determine whether to perform handover according to a user's selection.

According to an embodiments of the present disclosure, the first reference temperature for the handover may be set differently for each application (app), function, or service. Even if the temperature of the first communication module 240 satisfies the first reference temperature, at least one App may be set to do not perform handover to the second communication module 250, or to perform handover when the temperature of the first communication module 240 satisfies the third reference temperature that is equal to or greater than the first reference temperature.

According to an embodiments of the present disclosure, the processor 210 may control whether performing handover to the second communication module 250 based on a remaining time until an end of the first communication connection even if the temperature of the first communication module 240 satisfies the first reference temperature.

Figure 6:
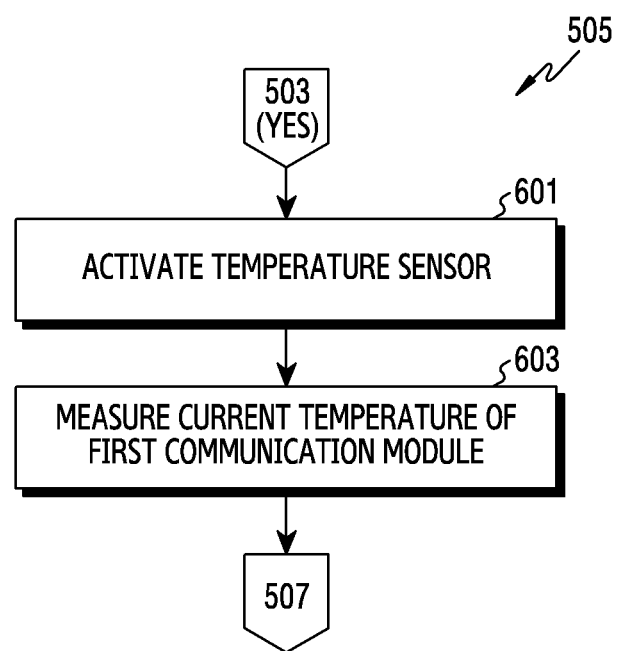
FIG. 6 is a flowchart illustrating an operation of monitoring the temperature of an electronic device according to an embodiment of the present disclosure.

FIG. 6 is a flowchart illustrating an operation of monitoring the temperature of an electronic device according to an embodiment of the present disclosure. Referring to FIG. 6, in operation 601, a processor (e.g., the processor 120 or the processor 210) of an electronic device (e.g., the electronic device 101 or the electronic device 200) according to an embodiment of the present disclosure may activate a temperature sensor (e.g., the temperature sensor 260). For example, the processor may activate the temperature sensor when a data throughput of a first communication module (e.g., the first communication module 240, the WiGig module 340, or the 5G NR module 360) is equal to or greater than a reference value. The temperature sensor may be located, for example, around the first communication module.

According to an embodiment of the present disclosure, in operation 603, the processor may measure (or recognize or calculate) a current temperature of the first communication module (or electronic device) through the temperature sensor. For example, the processor may measure the temperature through a change in a voltage input to correspond to a change in a resistance value according to the temperature when the temperature sensor is a thermistor. The processor may, for example, periodically measure the temperature.

According to an embodiment of the present disclosure, when the temperature measurement is completed, the processor may proceed to operation 507 of FIG. 5.

Figure 7:
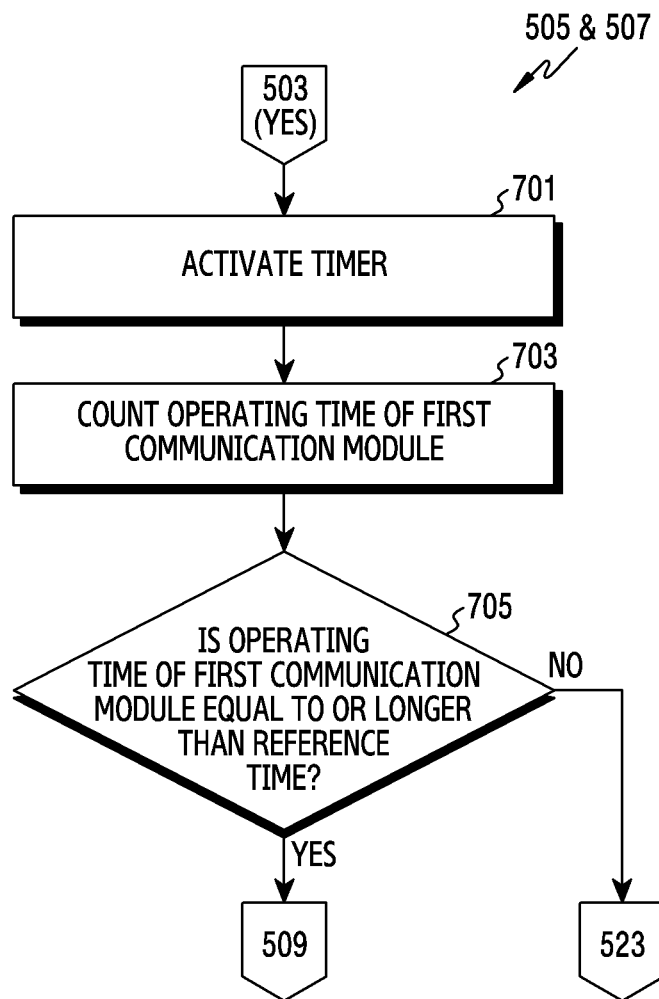
FIG. 7 is a flowchart illustrating an operation of monitoring the temperature of an electronic device according to an embodiment of the present disclosure.

FIG. 7 is a flowchart illustrating an operation of monitoring the temperature of an electronic device according to an embodiment of the present disclosure.

Referring to FIG. 7, in operation 701, a processor (e.g., the processor 120 or the processor 210) of an electronic device (e.g., the electronic device 101 or the electronic device 200) according to an embodiment of the present disclosure may activate a timer (not shown). For example, the processor may activate the timer when a data throughput of a first communication module (e.g., the first communication module 240, the WiGig module 340, or the 5G NR module 360) is equal to or greater than a reference value. The timer may use, for example, a system clock.

According to an embodiment of the present disclosure, in operation 703, the processor may count an operating time of the first communication module.

According to an embodiment of the present disclosure, in operation 705, the processor may determine whether the operating time of the first communication module is equal to or longer than (or exceeds) a reference time. For example, the reference time may be calculated (or determined) through repeated experimentation, as a time during which the temperature of the first communication module reaches a first reference temperature (e.g., 50 degrees) at the time of continuously transmitting data at the data throughput of the reference value or greater. For example, operation 705 may replace operation 507 of FIG. 5.

When the operating time is equal to or longer than (or exceeds) the reference time based on the determination result of operation 705, the processor may proceed to operation 509 of FIG. 5. For example, the processor may determine that the temperature of the first communication module is equal to or higher than (exceeds) the first reference temperature when the operating time of the first communication module is equal to or longer than (exceeds) the reference time, and may proceed to operation 509 of FIG. 5.

On the other hand, when the operating time is shorter than (or equal to or shorter than) the reference time based on the determination result of operation 705, the processor may proceed to operation 523 of FIG. 5. For example, when the operating time of the first communication module is shorter than (or equal to or shorter than) the reference time, the processor may determine that the temperature of the first communication module is lower than (or equal to or lower than) the first reference temperature, and may proceed to operation 523 of FIG. 5.

According to an embodiment of the present disclosure, the processor may estimate a change in the temperature of the first communication module using the data throughput and operating time of the first communication module.

In FIG. 7, when the data throughput of the first communication module is equal to or greater than the reference value (e.g., "YES" in operation 503), the processor may perform operation 701 of activating the timer. However, according to an embodiment, the processor may perform operation 701 regardless of the data throughput of the first communication module. For example, the processor may omit operation 503 and may proceed directly to operation 701 after performing operation 501 of FIG. 5. At this time, the reference time of operation 705 may be a time (e.g., 1 hour) during which the temperature of the first communication module reaches the first reference temperature (e.g., 50 degrees C./122 degrees F.) when the first communication module operates in a normal state regardless of the data throughput of the first communication module.

Figure 8:
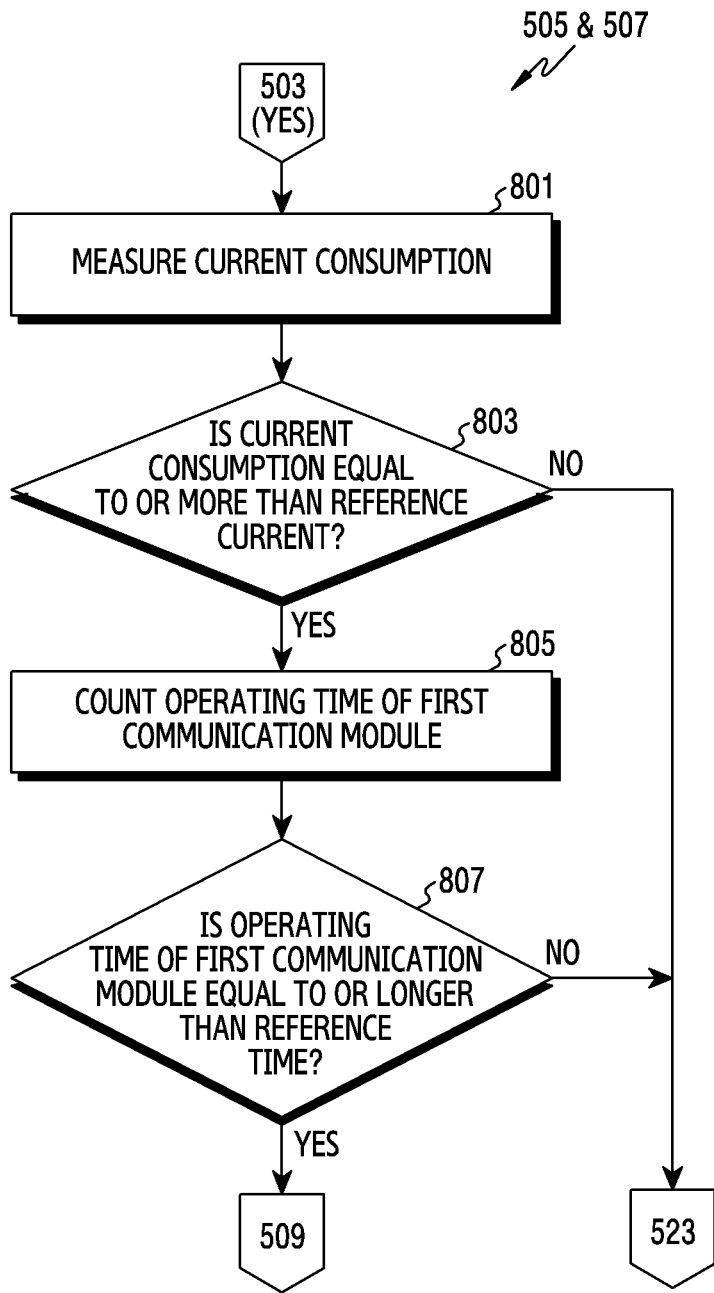
FIG. 8 is a flowchart illustrating an operation of monitoring the temperature of an electronic device according to an embodiment of the present disclosure.

FIG. 8 is a flowchart illustrating an operation of monitoring the temperature of an electronic device according to an embodiment of the present disclosure.

Referring to FIG. 8, in operation 801, a processor (e.g., the processor 120 or the processor 210) of an electronic device (e.g., the electronic device 101 or electronic device 200) according to an embodiment of the present disclosure may measure a current consumption of a first communication module (e.g., the first communication module 240, the WiGig module 340, or the 5G NR module 360). For example, the processor may measure the current consumption of the first communication module when the data throughput of the first communication module is equal to or greater than a reference value. According to an embodiment, the electronic device may further include a separate measurement module (not shown) that measures the current consumption of the first communication module. According to an embodiment of the present disclosure, in operation 803, the processor may determine whether the measured current consumption is equal to or more than (or exceeds) a reference current amount (e.g., 400 mA).

When the measured current consumption is less than (or equal to or less than) the reference current amount based on the determination result of operation 803, the processor may proceed to operation 523 of FIG. 5. On the other hand, when the measured current consumption is equal to or more than (or exceeds) the reference current amount based on the determination result of operation 803, the processor may count the operating time of the first communication module. For example, the processor may activate a timer to count the operating time of the first communication module.

According to an embodiment of the present disclosure, in operation 807, the processor may determine whether the operating time of the first communication module is equal to or longer than (exceeds) a designated reference time (e.g., 30 minutes). For example, the reference time may be calculated (or empirically determined) through repeated experimentation, as the time during which the temperature of the first communication module reaches a first reference temperature (e.g., 50 degrees C./122 degrees F.) when the first communication module operates at the reference current or more. For example, operation 807 may replace operation 507 of FIG. 5.

When the operating time of the first communication module is equal to or longer than (or exceeds) the reference time based on the determination result of operation 807, the processor may proceed to operation 509 of FIG. 5. For example, when the operating time of the first communication module is equal to or longer than (or exceeds) the reference time, the processor may determine that the temperature of the first communication module is equal to or higher than (or exceeds) the first reference temperature, and may proceed to operation 509 of FIG. 5. On the other hand, when the operating time of the first communication module is shorter than (or equal to or shorter than) the reference time based on the determination result of operation 807, the processor may proceed to operation 523 of FIG. 5. For example, when the operating time of the first communication module is shorter than (or equal to or shorter than) the reference time, the processor may determine that the temperature of the first communication module is lower than (or equal to or lower than) the first reference temperature, and may proceed to operation 523 of FIG. 5.

In FIG. 8, when the data throughput of the first communication module is equal to or greater than the reference value (e.g., "YES" in operation 503), the processor may perform operation 801 of measuring the current consumption. However, in an embodiment, the processor may perform operation 801 regardless of the data throughput of the first communication module. For example, the processor may omit operation 503 and may proceed directly to operation 801 after performing operation 501 of FIG. 5.

According to certain embodiments of the present disclosure, a communication method of an electronic device (e.g., the electronic device 101 or the electronic device 200) may include performing data communication using a first transceiver (e.g., the first communication module 240, the WiGig module 340, or the 5G NR module 360); determining whether a data throughput of the first transceiver is equal to or greater than a designated reference value; monitoring the temperature of the first transceiver when the data throughput is equal to or greater than the designated reference value; and determining whether to perform a handover from the first transceiver to a second transceiver (e.g., the second communication module 250, the Wi-Fi module 350, or the LTE module 370) having a data throughput smaller than that of the first transceiver to perform data communication when the monitored temperature is equal to or higher than a designated first reference temperature.

According to certain embodiments, the performing of the handover may further include determining whether the intensity of a received signal of the second transceiver is equal to or more than a designated reference electric field; performing the handover when the intensity thereof is equal to or more than the reference electric field; and maintaining data communication through the first transceiver when the intensity thereof is less than the reference electric field.

According to certain embodiments, the communication method may further include periodically monitoring the temperature of the first transceiver after performing the handover; and determining whether to perform a handover from the second transceiver back to the first transceiver based at least in part on whether the temperature of the first transceiver decreases to a designated second reference temperature or lower.

According to certain embodiments, the performing of the handover to the first transceiver may include determining whether the intensity of a received signal of the first communication module is equal to or more than a designated reference electric field when the temperature of the first transceiver decreases to the second reference temperature or lower; performing handover from the second transceiver to the first transceiver when the intensity of the received signal of the first transceiver is equal to or more than the reference electric field; and maintaining data communication through the second transceiver when the intensity of the received signal of the first transceiver is less than the reference electric field.

According to certain embodiments, the monitoring of the temperature of the first transceiver may include periodically measuring the temperature of the first transceiver through a temperature sensor (e.g., temperature sensor 260) located around the first transceiver.

According to certain embodiments, the monitoring of the temperature of the first transceiver may include counting the operating time of the first transceiver; determining whether the operating time of the first transceiver is equal to or longer than a designated reference time; and determining that the temperature of the first transceiver is equal to or higher than the first reference temperature when the operating time thereof is equal to or higher than the reference time.

According to certain embodiments, the monitoring of the temperature of the first transceiver may include measuring the current consumption of the first transceiver; identifying the operating time of the first transceiver when the measured current consumption exceeds a designated reference current; and determining that the temperature of the first transceiver is equal to or higher than the first reference temperature when the operating time thereof is equal to or longer than the designated reference time.

According to certain embodiments, the communication method may further include adjusting the quality of data communication based on the performance of the second transceiver at the time of performing the handover; and displaying, on a display (e.g., the display device 160 or the display 230), a user interface notifying a user that the handover has been performed and the quality has been adjusted.

Certain embodiments of the present disclosure can prevent the electronic device from overheating due to high-speed communication. Certain embodiments of the present disclosure can control heat generation through handover of data communication and provide seamless data communication. In addition, certain embodiments of the present disclosure can quickly dissipate excessive heat of the electronic device by turning off the power of the high-speed transceiver at the time of completion of handover.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

Certain embodiments disclosed herein are provided merely to easily describe technical details of the present disclosure and to help the understanding of the present disclosure, and are not intended to limit the scope of the present disclosure. Accordingly, the scope of the present disclosure should be construed as including all modifications or various other embodiments based on the technical idea of the present disclosure.

What is claimed is:

1. A portable communication device comprising:
   at least one communication module configured to transmit or receive a wireless signal corresponding to 5G communication and transmit or receive a wireless signal corresponding to 4G communication;
   a temperature sensor;
   at least one processor operatively coupled to the at least one communication module and the temperature sensor; and
   memory operatively coupled to the at least one processor, wherein the memory stores instructions that, when executed by the at least one processor, cause the portable communication device to perform a plurality of operations comprising:
   causing the at least one communication module to establish a 5G data communication link between the portable communication device and a first communication network using the at least one communication module;
   performing data communication via the 5G data communication link;
   monitoring a temperature of the portable communication device using the temperature sensor; and
   based at least in part on a determination that the temperature is higher than a specified value while a data throughput is maintained greater than a specified data throughput, releasing the 5G data communication link and performing the data communication via a 4G data communication link established between the portable communication device and a second communication network using the at least one communication module to control heat generation due to high-speed communication including the 5G communication.

2. The portable communication device of claim 1, wherein the plurality of operations further comprises:
   establishing another 5G data communication link using the at least one communication module based at least in part on a determination that the temperature is lower than the specified value after the 5G communication link is released.

3. The portable communication device of claim 1, further comprising a display connected to the at least one processor, and wherein performing the data communication via the 5G data communication link comprises displaying on the display a first indication indicating that the data communication is being performed via the 5G data communication link; and wherein performing of the data communication via the 4G data communication link comprises displaying on the display a second indication indicating that the data communication is being performed via the 4G data communication link.

4. The portable communication device of claim 1, wherein the at least one communication module comprises an array antenna.

5. The portable communication device of claim 4, wherein performing data communication via the 5G data communication link comprises performing data communication using the array antenna.

6. The portable communication device of claim 4, wherein the at least one communication module comprises another antenna.

7. The portable communication device of claim 6, wherein performing the data communication via the 4G data communication link comprises performing data communication using the another antenna.

8. The portable communication device of claim 1, wherein monitoring the temperature of the portable communication device comprises:
  while the data throughput is maintained greater than the specified data throughput, continuing to perform the data communication via the 5G data communication link and monitoring the temperature of the portable communication device using the temperature sensor.

9. The portable communication device of claim 1, wherein the data throughput is about at least in part of communication performed by the at least one communication module.

10. A method for performing data communication with a portable communication device, the method comprising:
  establishing a 5G data communication link between the portable communication device and a first communication network using at least one communication module;
  performing data communication via the 5G data communication link;
  monitoring a temperature of the portable communication device using a temperature sensor; and
  based at least in part on a determination that the temperature is higher than a specified value while a data throughput is maintained greater than a specified data throughput, releasing the 5G data communication link and performing the data communication via a 4G data communication link established between the portable communication device and a second communication network using the at least one communication module to control heat generation due to high-speed communication including the 5G communication.

11. The method of claim 10, further comprising:
  establishing another 5G data communication link using the at least one communication module based at least in part on a determination that the temperature is lower than the specified value after the 5G communication link is released.

12. The method of claim 10, wherein performing the data communication via the 5G data communication link comprises displaying on a display a first indication indicating that the data communication is being performed via the 5G data communication link; and wherein performing of the data communication via the 4G data communication link comprises displaying on the display a second indication indicating that the data communication is being performed via the 4G data communication link.

13. The method of claim 10, wherein the at least one communication module comprises an array antenna.

14. The method of claim 13, wherein performing data communication via the 5G data communication link comprises performing data communication using the array antenna.

15. The method of claim 13, wherein the at least one communication module comprises another antenna.

16. The method of claim 15, wherein performing the data communication via the 4G data communication link comprises performing data communication using the another antenna.

17. A non-transitory computer readable medium storing a plurality of executable instructions, wherein execution of the plurality of executable instructions by at least one processor causes the at least one processor to perform a plurality of operations comprising:
  establishing a 5G data communication link between a portable communication device and a first communication network using at least one communication module;
  performing data communication via the 5G data communication link;
  monitoring a temperature of the portable communication device using a temperature sensor; and
  based at least in part on a determination that the temperature is higher than a specified value while a data throughput is maintained greater than a specified data throughput, releasing the 5G data communication link and performing the data communication via a 4G data communication link established between the portable communication device and a second communication network using the at least one communication module to control heat generation due to high-speed communication including the 5G communication.

18. The non-transitory computer readable medium of claim 17, wherein the plurality of operations further comprises:
  establishing another 5G data communication link using the at least one communication module based at least in part on a determination that the temperature is lower than the specified value after the 5G communication link is released.

19. The non-transitory computer readable medium of claim 17, wherein performing the data communication via the 5G data communication link comprises displaying on a display a first indication indicating that the data communication is being performed via the 5G data communication link; and wherein performing of the data communication via the 4G data communication link comprises displaying on the display a second indication indicating that the data communication is being performed via the 4G data communication link.

20. The non-transitory computer readable medium of claim 17, wherein performing data communication via the 5G data communication link comprises performing data communication using an array antenna.

\* \* \* \* \*